United States Patent [19]
Bertrand

[11] 3,920,470
[45] Nov. 18, 1975

[54] COMPOSITION BASED ON BITUMEN AND A FILLER

[75] Inventor: Olivier Bertrand, Gaurain Ramecroix, Belgium

[73] Assignee: Societe Generale des Ciments Portland de l'Escaut, Antoing, Belgium

[22] Filed: Aug. 20, 1974

[21] Appl. No.: 498,923

Related U.S. Application Data

[62] Division of Ser. No. 355,029, April 27, 1973, abandoned.

[30] Foreign Application Priority Data

May 5, 1972 Belgium .............................. 117203

[52] U.S. Cl. ........... 106/288 B; 106/281 R; 106/280
[51] Int. Cl.² .......................................... C09C 1/28
[58] Field of Search ............ 106/288 B, 281 R, 282, 106/284

[56] References Cited
UNITED STATES PATENTS

| | | | |
|---|---|---|---|
| 1,549,656 | 7/1925 | Drummond ..................... | 106/281 R |
| 1,596,232 | 7/1926 | Black ............................. | 106/281 R |
| 2,510,971 | 6/1950 | Goddin .......................... | 106/281 R |

*Primary Examiner*—Winston A. Douglas
*Assistant Examiner*—J. V. Howard

[57] ABSTRACT

A filler for admixture with bitumen for paving roads and the like, said filler comprising a natural mineral filler material containing at least 50 percent of silica, 20 to 80 percent of said silica being in the form of at least one of the group consisting of opal and chalcedony, said filler having a fineness at which at least 82 percent will pass through a 74 micronmesh screen and having been subjected to a heat treatment at a temperature between 100°C and 800°C. A method for preparing said filler is also described.

5 Claims, No Drawings

COMPOSITION BASED ON BITUMEN AND A FILLER

This is a division of application Ser. No. 355,029, filed Apr. 27, 1973, now abandoned.

The present invention is concerned with a composition based on bitumen and a filler, which has a low sensitivity to water, and is suitable in particular for the construction of roads.

It is well known that the fillers that can be used in these compositions must meet certain requirements regarding in particular air fineness and their ability to absorb bitumen. When mixed with bitumen they must also have a low sensitivity to water so that they do not become detached from the mixture when it is in the presence of water.

When efforts are made to use bitumen-base compositions containing siliceous mineral materials, it is found that these compositions are often too sensitive to water, even if the filler meets the conditions regarding the ability to absorb the bitumen. This is particularly the case with materials which contain silica partly in the form of opal and/or in the form of chalcedony, and partly in the form of quartz alone, in addition to a little $SiO_2$ present in the form of silicates. Materials containing silica almost exclusively in the form of quartz or silicates generally have a very low capacity for absorbing bitumen.

Of the natural mineral materials containing silica partly in the form of opal and/or in the form of chalcedony, mention may be made of such materials as cenomanian gaize or a sandstone of the same geological age. Aube, oxfordian or Argonne gaizes, siliceous and Landenian tuffs, as well as spongolite. In the natural state these materials are rarely suitable as fillers for bitumen because of their excessive sensitivity to the water in the mixture.

The object of the present invention is to reduce this disadvantage.

It relates to a bitumen-base composition which contains, as a filler, a natural mineral material containing at least 50 percent of silica, part of which is present in the form of opal and/or in the form of chalcedony, and which has been subjected to a heat-treatment at a temperature of between 100° and 800°C. Preferably from 20 to 80 percent of the silica is present in the form of opal and/or chalcedony.

Before being subjected to heat-treatment, the mineral material may have been milled to the fineness required in the filler. Advantageously however the mineral material may be subjected to the heat-treatment in the coarsely crushed state and the fine portion may be collected by means of a granulometric separation process, for example in a dust-removal or screening plant. The fine portion is then milled to the fineness required of the filler, whereas the coarse portion, optionally after further crushing, may be subjected to a fresh heat-treatment or may be used for other purposes.

When, in addition to silica, the mineral material also contains an appreciable quantity of alkaline-earth carbonate, the heat-treatment is limited to a temperature at which the carbonate does not undergo decomposition. That is to say the temperature is lower than 500°C, since the presence of free oxide in the filler would, together with the bitumen, result in a composition that has little resistance to water and exhibits other defects, such as swelling of the filler or an undesirable change in the properties of the bitumen.

In the following, sensitivity to water was determined in accordance with the Dutch specifications issued in 1967 by the Rijkswaterstraat. These specifications require that sensitivity to water be determined by means of a test in which an aqueous mixture of filler and asphalt bitumen fluidized by a solvent is stirred at a specified speed and during a given period at a temperature of 60°C, the quantity of filler passing into the water then being determined. If the filler is to be acceptable this quantity must not exceed 10 percent of that employed for the test.

The sensitivity to water of a bitumen and filler composition may depend not only upon the filler but also upon the properties and thus the source of the bitumen. The Dutch specifications simply state that for the water-sensitivity test on the bitumen and filler composition, the bitumen must be fluidized with kerosene in such manner as to obtain a liquid having a predetermined viscosity but the specifications say nothing on the subject of the origin of the bitumen to be used. It has been found however that the sensitivity to water of compositions containing the same filler but with bitumens from different sources may differ very considerably. It has been found for example that for a batch of bitumen coming from Venezuela the sensitivity to water of the composition was 2 percent, whereas it was more than 20 percent when a batch of bitumen from the Middle East was used under the same conditions.

In order to obtain fillers of the best possible quality, Middle East bitumen was used in the tests that are mentioned in the examples given below, it being felt that if the sensitivity to water of the compositions containing this bitumen is good, it will be better still in the case of compositions containing bitumens having less effect upon the sensitivity to water of the compositions.

The natural siliceous materials listed below were subjected to this test and used in the examples.

| No | Type | $SiO_2$ Content | | |
|---|---|---|---|---|
| | | total | as quartz | as opal and/or chalcedony |
| 1 | Cenomanian gaize | 92% | 5% | 80% |
| 2 | Cenomanian gaize | 80 | 20 | 55 |
| 3 | Aube gaize | 81 | 10 | 65 |
| 4 | Aube gaize | 84 | 15 | 65 |
| 5 | Oxfordian gaize | 90 | 15 | 70 |
| 6 | Argonne gaize | 90 | 10 | 75 |
| 7 | Spongolite | 83 | 5 | 75 |
| 8 | Cenomanian sandstone | 95 | 80 | 14 |
| 9 | Landenian tuff | 85 | 35 | 45 |
| 10 | Siliceous tuff | 80 | 35 | 40 |

Except where otherwise indicated, these materials were ground until less than 18 percent would not pass through a 74 micron-mesh screen, this percentage being indicated under the heading "fineness" in the examples.

EXAMPLE 1

After grinding, the materials 2, 3 and 9 were heated for 30 minutes at a temperature of 500°C. Their sensitivity to water was determined before and after the heat-treatment.

| Material | Fineness | Sensitivity to Water | |
|---|---|---|---|
| | | before | after the heat treatment |
| 2 | 15% | 34 | 1 |

-continued

| Material | Fineness | Sensitivity to Water | |
|---|---|---|---|
| | | before | after the heat treatment |
| 3 | 9.6% | 25 | 0 |
| 9 | 8.3% | 31 | 1–2 |

The heat-treatment has a surprising effect as regards improving the sensitivity to water of a composition containing bitumen and a filler based on these materials, and thus renders these materials suitable for use as a filler for bitumen.

EXAMPLE 2

Examples of various natural siliceous materials were heated at 110°, 500° and 750°C for 30 minutes, and the sensitivity to water of the composition containing bitumen was determined after heat-treatment.

| Material | Fineness | Sensitivity to Water after heat-treatment at | | |
|---|---|---|---|---|
| | | 110°C | 500°C | 750°C |
| 1 | 11% | 45 | 43 | 0 |
| 2 | 18 | 34 | 1 | — |
| 3 | 17 | 28 | 0 | — |
| 4 | 10 | 10 | 0 | — |
| 5 | 7 | 36 | 12 | 7 |
| 6 | 14 | 41 | 2 | — |
| 7 | 12 | 39 | 2 | — |
| 8 | 18 | 39 | 15 | 3 |

These tests show that the various siliceous materials react differently to the heat-treatment. For most of the materials, a treatment at 500°C is sufficient to make them suitable as fillers for bitumen, but a treatment at a higher temperature is necessary for certain of them. On the other hand, other materials acquire a suitable sensitivity to water even after treatment at a temperature a little above the drying temperature of 110°C.

EXAMPLE 3

Samples of materials 9 and 10 were heated for 30 minutes at each of a number of different increasing temperatures, and their sensitivity to water was determined.

| Material | Fineness | Sensitivity to Water after heat-treatment at | | | | | |
|---|---|---|---|---|---|---|---|
| | | 110°C | 150°C | 275°C | 500°C | 575°C | 650°C |
| 9 | 9% | 31 | — | 15 | 1–2 | 2 | 2–3 |
| 10 | 8% | 24 | 8 | 4 | 1 | — | 1–2 |

In the case of material 9, it will be seen that heating at a temperature between 275° and 500°C suffices to bring the sensitivity to water of the material, when mixed with bitumen, below the limit of 10 percent, whereas in the case of material 10, this limit is reached and passed downwardly after heating at 150°C. These two materials furthermore give the impression that at temperatures above 500°C, the sensitivity to water of the composition containing them and bitumen tends to increase a little with temperature. It would therefore appear that there is an optimum temperature for heat treatment which may differ from one material to another.

EXAMPLE 4

Tests were carried out with a view to determining the influence of the fineness of the siliceous material on the effect of the heat-treatment.

For these tests use was made of the crushed material 10 containing particles of every fineness less than 4.75mm. This rough crushed material, or certain granulometric fractions thereof, were subjected to a heat-treatment, and then one portion of the coarse material was milled until only approximately 8 to 10 percent thereof would not pass through a 74 micron-mesh screen. Another portion of this coarse crushed material was subjected to heat-treatment and the fine fractions were separated therefrom, and these were in turn milled to the same fineness. The sensitivity to water of the two finely milled samples was determined.

a. The rough crushed material 10 was exposed to a current of air at a temperature of 110°C, and a portion of the material thus treated was passed through a cyclone to extract the dust therefrom. The test for determining sensitivity to water gave the following results:

| Material | Fineness | Sensitivity to Water |
|---|---|---|
| coarse crushed | 8% | 24 |
| dust | 8% | 7 | b. The coarse crushed material 10 was passed through an industrial dryer and transported therethrough by a gas having a temperature of 180°C at the outlet. The fine product from a portion of the material leaving the stove was separated by screening on a 1 mm-mesh screen and, after grinding the two samples to the required fineness as indicated below, the sensitivity to water of the samples when mixed with bitumen was determined.

| Material | Fineness | Sensitivity to Water |
|---|---|---|
| coarse crushed | 9% | 20 |
| screened | 9% | 6 | c. Coarse crushed material 10 was divided into various granulometric fractions and each fraction was subjected to a temperature of 275°C for one hour. The fractions were then milled to a fineness at which approximately 9 percent of the material would not pass through a 74 micron-mesh screen.

| Granulometric fraction | Sensitivity to Water |
|---|---|
| 4.75 to 2.00 mm | 11 |
| 2.00 to 0.85 mm | 9 |
| 0.85 to 0.42 mm | 7 |
| 0.42 to 0.15 mm | 4 |

This example shows that the natural siliceous materials can be advantageously finely milled before undergoing heat-treatment. Example 3 shows that it suffices to heat material 10 for 30 minutes at 275°C when milled to a fineness, at which 8 percent of the material will not pass through a 74 micron-mesh screen, to bring the sensitivity to water of the composition to 4 percent. However, as indicated above, it is necessary to keep the temperature at 275°C for one hour in order to obtain the same result with the 0.42 to 0.15 mm granulometric fraction of the same material.

Thus, prior milling to the ultimate fineness makes it possible to reduce the temperature at which the heat-treatment of the filler should be carried out in order to reduce the sensitivity to water of the bitumen and filler mixture to a level below the limit of 10 percent imposed by the specifications. According to Example 3, heat-treatment at 150°C for 30 minutes carried out on material 10 having an ultimate fineness at which 8 percent of the material does not pass through a 74 micron-mesh screen makes it possible to obtain a figure of 8 percent for the sensitivity to water of the material when mixed with bitumen. However, as shown by Example 4c, heating at 275°C for one hour is necessary to obtain a comparable result as regards sensitivity to water of the composition, if the heat-treatment of material 10 is carried out when it is in the form of particles corresponding to fractions of 2 to 0.85 and of 0.85 to 0.42 mm and when grinding to the ultimate fineness of the filler only takes place after heat-treatment.

If grinding to the fineness required for the filler is not possible prior to heat-treatment or is not desirable due for example to the dust produced during heat-treatment, good results are obtained at relatively low heat-treatment temperatures by separating fine portions from the coarse crushed material or from a fraction of this material that has undergone heat-treatment, separation being carried out by a suitable granulometric process, for example in a dust-removal or screening installation. The fine separate portions are then ground to the fineness required in the filler, and the coarse portions can be subjected to a fresh heat-treatment, optionally after having again passed through a crusher, or they may be used for some other purpose.

The invention is not of course limited to the embodiments described by way of example, and modifications may be made within the scope of the invention.

I claim:
1. A filler for admixture with bitumen for paving roads and the like, said filler having a high capacity for absorbing bitumen and a low sensitivity to water when bitumen is mixed with and absorbed therein, said filler comprising a natural mineral filler material containing at least 50 percent of silica, 20 to 80 percent of said silica being in the form of at least one of the group consisting of opal and chalcedony, said filler having a fineness at which at least 82 percent will pass through a 74 micronmesh screen and having been subjected to a heat treatment at a temperature between 100° C. and 800° C.

2. A filler as claimed in claim 1 wherein the natural mineral filler material contains at least a portion of alkaline-earth carbonates and the filler has been heat treated to a temperature not higher than 500° C.

3. A method of preparing a filler for admixture with bitumen for paving roads and the like comprising milling a natural mineral filler material to a fineness at which at least 82 percent will pass through a 74 micronmesh screen, said filler material containing at least 50 percent of silica, of which 20 to 80 percent is in the form of at least one of the group consisting of opal and chalcedony, and heating said filler material to a temperature between 100° C. and 800°C, said filler material having a high capacity for absorbing bitumen and having a low sensitivity to water when bitumen is absorbed therein.

4. A method as claimed in claim 3 wherein the milling of the natural mineral filler material precedes the heating step.

5. A method as claimed in claim 3 wherein the heating of the natural mineral filler material is carried out before the milling step and further comprising removing filler material having the desired fineness from the heat treated filler material before milling the remainder of the filler material to the desired fineness.

* * * * *